(12) United States Patent  
Machino

(10) Patent No.: US 8,655,585 B2  
(45) Date of Patent: Feb. 18, 2014

(54) NAVIGATION APPARATUS

(75) Inventor: Hiroshi Machino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 721 days.

(21) Appl. No.: 12/520,783

(22) PCT Filed: Oct. 31, 2007

(86) PCT No.: PCT/JP2007/071225  
§ 371 (c)(1),  
(2), (4) Date: Jun. 22, 2009

(87) PCT Pub. No.: WO2008/096485  
PCT Pub. Date: Aug. 14, 2008

(65) Prior Publication Data  
US 2010/0094549 A1    Apr. 15, 2010

(30) Foreign Application Priority Data  
Feb. 5, 2007    (JP) ................................ 2007-025697

(51) Int. Cl.  
*G01C 21/26* (2006.01)  
*G01C 21/00* (2006.01)

(52) U.S. Cl.  
USPC ........... 701/454; 701/411; 701/467; 701/487; 701/538; 340/995.1; 340/995.19

(58) Field of Classification Search  
USPC ......... 701/202, 206, 209, 411, 454, 467, 487, 701/532, 533, 538; 340/988, 990, 995.1, 340/995.11, 995.19  
See application file for complete search history.

(56) References Cited

U.S. PATENT DOCUMENTS

| | | | |
|---|---|---|---|
| 6,295,503 B1 * | 9/2001 | Inoue et al. | 701/410 |
| 7,194,356 B2 * | 3/2007 | Sano | 701/428 |
| 2005/0055158 A1 * | 3/2005 | Machino | 701/209 |
| 2006/0173615 A1 | 8/2006 | Pinkus et al. | |
| 2009/0248294 A1 | 10/2009 | Machino | |
| 2010/0063720 A1 | 3/2010 | Machino | |
| 2010/0094538 A1 | 4/2010 | Machino | |

FOREIGN PATENT DOCUMENTS

| | | |
|---|---|---|
| DE | 112007002388 T5 | 7/2009 |
| DE | 112007002882 T5 | 9/2009 |
| DE | 112007003210 T5 | 11/2009 |
| EP | 1975560 A1 | 10/2008 |
| JP | 2000-131085 A | 5/2000 |
| JP | 2001-183159 A | 7/2001 |
| JP | 2004-198278 A | 7/2004 |
| JP | 2005-61988 A | 3/2005 |
| JP | 2005-83758 A | 3/2005 |
| WO | WO 2008/083747 A1 | 7/2008 |

* cited by examiner

*Primary Examiner* — Thomas Tarcza  
*Assistant Examiner* — Adam Tissot  
(74) *Attorney, Agent, or Firm* — Birch, Stewart, Kolasch & Birch, LLP.

(57) ABSTRACT

A navigation apparatus includes a display means 2 for displaying either a route using a car pool lane or a route not using the car pool lane, an input means 3 and 210 for inputting a command, and a control unit 10 for switching from the route using the car pool lane, which is displayed by the display means, to the route not using the car pool lane or vice versa according to a command inputted from the input means.

5 Claims, 6 Drawing Sheets

FIG. 6

| HOV Settings | | Entrance | | Exit | |
|---|---|---|---|---|---|
| | | | | | Map |
| Restriction Enable or Disable: | | Yes  No | | Yes  No | |
| Number of Passengers: | | ◄ | 2 | ► | ◄ | 2 | ► |
| Lanes: | | ◄ | Five Lanes | ► | ◄ | Five Lanes | ► |
| Vehicle Type: | | ◄ | Truck | ► | ◄ | Truck | ► |
| Day of Week Setting: | | ◄ | Weekday | ► | ◄ | Weekday | ► |
| Toll Fee: | | ◄ | Free | ► | ◄ | Free | ► |
| Time Zone Setting: | | ◄ | 7:00 | ► | ◄ | 17:00 | ► |
| | | ◄ | 12:00 | ► | ◄ | 19:00 | ► |
| Enter | Initial Setting | | | | Return |

FIG. 7
(a)
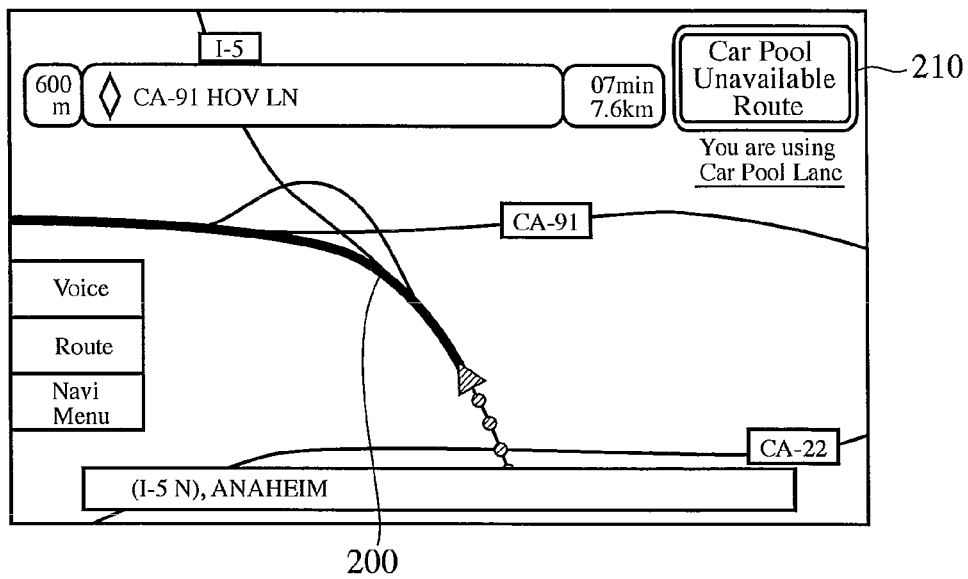
(b)
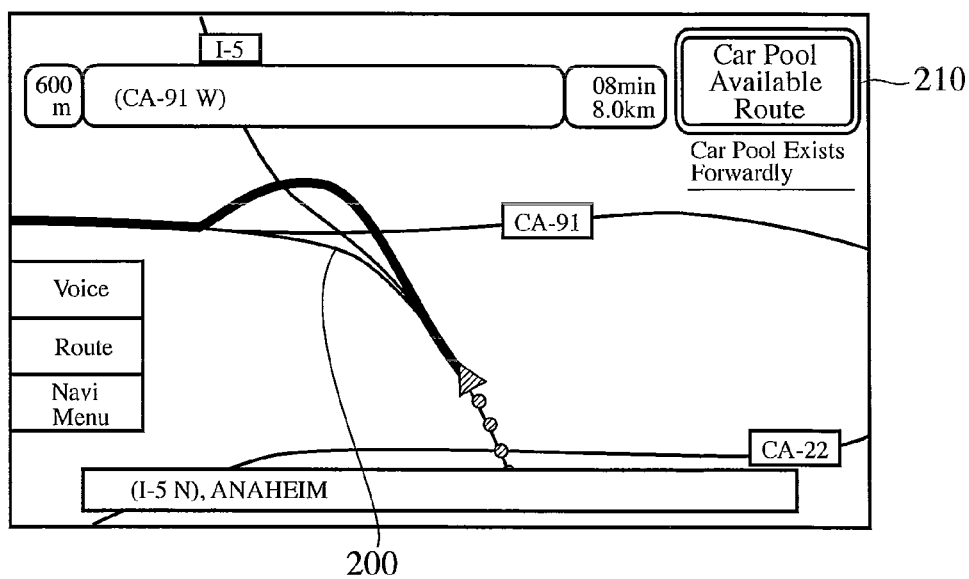

NAVIGATION APPARATUS

FIELD OF THE INVENTION

The present invention relates to a navigation apparatus that provides a guidance along a route and a guidance. More particularly, it relates a technology of switching between a route using a car pool lane and a route not using the car pool lane to display one of them.

BACKGROUND OF THE INVENTION

A conventional navigation apparatus displays the current position of a vehicle which is determined by a vehicle position calculating unit on a digital map (simply referred to as a "map" from here on) displayed on a display unit while superimposing the current position on the map. Furthermore, the conventional navigation apparatus searches for a recommended route from the current position of the vehicle which is determined by the vehicle position calculating unit to a destination inputted via an input unit, and displays the recommended route on the map. The conventional navigation apparatus then carries out a route guidance along the recommended route on the basis of the shapes of road links read from a recording medium.

By the way, recent years have seen increase in the number of cars owned by individuals and occurrence of traffic congestions in various parts of roads. Especially, most of vehicles traveling along a highway or expressway (simply referred to as a "highway" from here on in this specification) which is extending to a big city and which is used for commuting or the like are occupied by only one person and this results in increase in traffic congestions. In order to solve this problem, there have been constructed highways where traffic is restricted by law according to the conditions of vehicles including the number of passengers and vehicle types.

For example, a car pool lane (Car Pool Lane) which is adopted by a road system mainly seen in big cities of North American is an example. A car pool lane is also called an HOV lane (High Occupancy Vehicle Lane), and is a lane along which, for example, only vehicles in each of which two or more persons are riding are granted to travel. For example, a lane which is also provided on a highway is known as a car pool lane. A road system which adopts such a car pool lane provides users with a preferential treatment that makes it possible to arrive at the destination in a shorter time as long as they travel along a car pool lane so as to prod users to share a vehicle with one or more persons, thereby reducing the traffic as a whole and therefore reducing traffic congestions.

As a technology relevant to such a car pool lane, patent reference 1 discloses a vehicle-mounted navigation apparatus that searches for a recommended route in consideration of the number of passengers. This vehicle-mounted navigation apparatus has a storage unit for storing map data including link data about each link which constructs a road on a map. As for a car pool link on which restrictions of prohibiting a vehicle which is not occupied by two or more persons from traveling are imposed, the vehicle-mounted navigation apparatus uses link data including information showing that such restrictions are imposed on the car pool link to search for a recommended route from the place of departure to the destination. Furthermore, when a car pool link is included in the constitution links which construct the recommended route, the vehicle-mounted navigation apparatus receives an input of the number of passengers, and searches for a recommended route from the place of departure to the destination by using the link data to exclude links along which the vehicle cannot travel because the received number of passengers does not meet a certain criterion.

Patent reference 2 discloses a route searching apparatus that can perform a search for a route in consideration of the conditions of a vehicle through an easy operation. This route searching apparatus is provided with a map data acquiring unit for acquiring map data defined by nodes and road links, a route searching unit for searching for a route to a destination before the conditions of the vehicle are set up, taking into consideration a road link corresponding to a specific road for which whether or not the vehicle can travel according to the conditions of the vehicle is determined, the road link being included in the map data acquired by the map data acquiring unit, and an output unit for outputting the route searched for by the route searching unit.

[Patent reference 1] JP, 2005-061988,A
[Patent reference 2] JP, 2005-083758,A

A conventional navigation apparatus that can select whether to use a car pool lane as a search condition before performing a route search is known. However, there is a case in which while driving along a highway the user would like to travel a car pool lane of the highway if the conditions required for traveling the car pool lane are satisfied. Furthermore, there is a case in which while driving along a highway, the user would like to decide to switch to a "route using" a car pool lane or a "route not using" the car pool lane after recognizing the road status or congestion status of the highway. The conventional navigation apparatus is required to, in such a case, present either a route using a car pool lane or a route not using the car pool lane for the user in response to the user's prompt or easy operation.

The present invention is made in order to meet the above-mentioned requirement, and it is therefore an object of the present invention to provide a navigation apparatus which can present either a route using a car pool lane or a route not using the car pool lane for a user in response to the user's prompt or easy operation.

DISCLOSURE OF THE INVENTION

In order to solve the aforementioned problem, a navigation apparatus in accordance with the present invention includes: a display unit for displaying either a route using a car pool lane or a route not using the car pool lane; an input unit for enabling an input of a command for displaying the route not using the car pool lane when the route using the car pool lane is displayed by the display unit, and for enabling an input of a command for displaying the route using the car pool lane when the route not using the car pool lane is displayed by the display unit; and a control unit for switching from the route using the car pool lane, which is displayed by the display unit, to the route not using the car pool lane or vice versa according to a command inputted from the input unit.

When there exists a car pool lane in the route to the destination, the navigation apparatus in accordance with the present invention can make the display means to switch to either a display of the route using the car pool lane or a display of the route which does not use the car pool lane by receiving a command from the input means. Therefore, the navigation apparatus can present either the route using the car pool lane or the route not using the car pool lane for the user in response to the user's prompt or easy operation.

BRIEF DESCRIPTION OF THE FIGURES

FIG. 6 is a view showing an example of a car pool lane setup screen displayed in the navigation apparatus in accordance with Embodiment 1 of the present invention; and FIG. 7 is a view showing an example of a route guidance screen displayed in the navigation apparatus in accordance with Embodiment 1 of the present invention.

PREFERRED EMBODIMENTS OF THE INVENTION

Hereafter, in order to explain this invention in greater detail, the preferred embodiments of the present invention will be described with reference to the accompanying drawings.

Embodiment 1.

Figure 1:
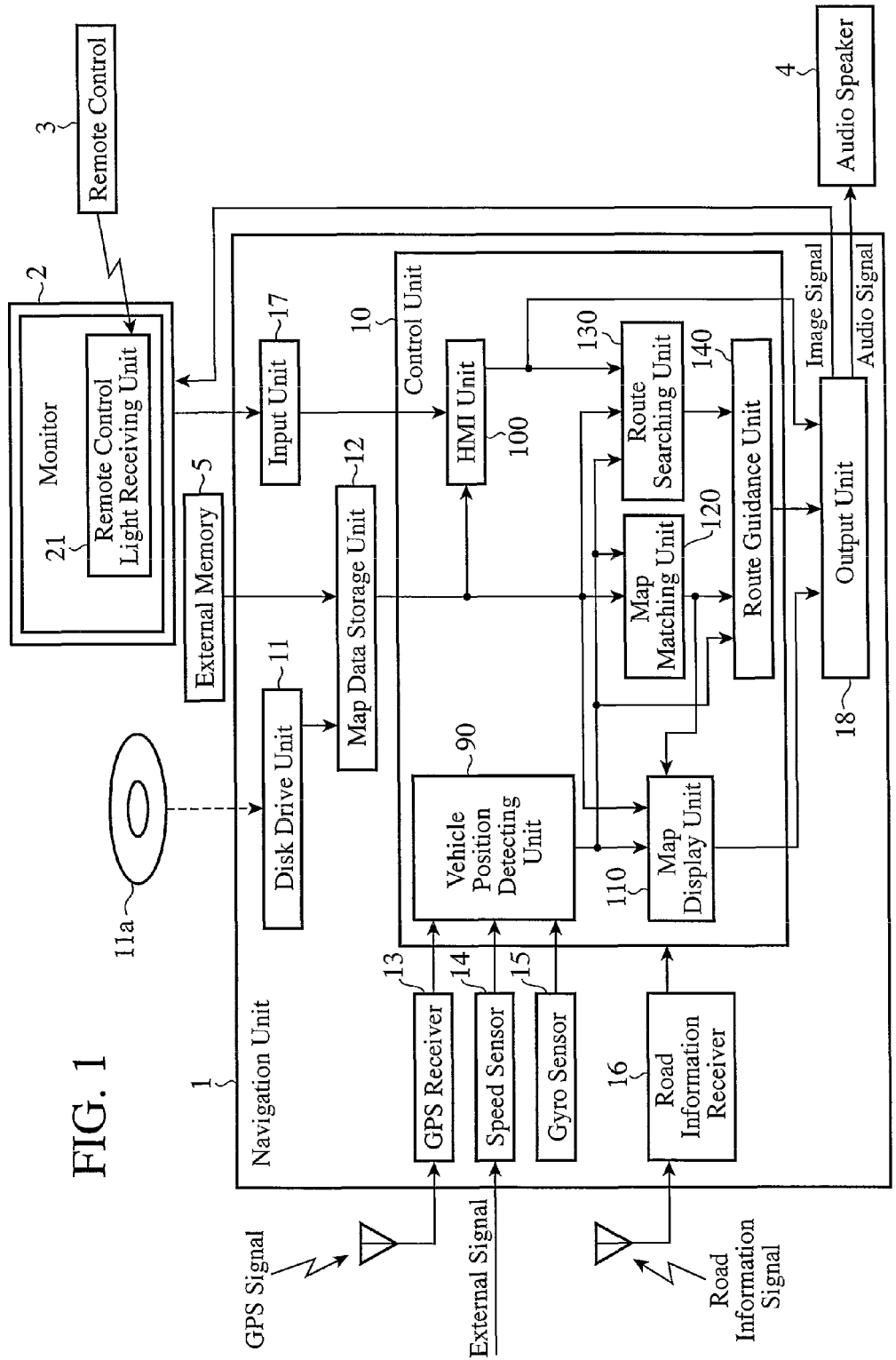
FIG. 1 is a block diagram showing the structure of a navigation apparatus in accordance with Embodiment 1 of the present invention.

FIG. 1 is a block diagram showing the structure of a navigation apparatus in accordance with Embodiment 1 of the present invention. This navigation apparatus is comprised of a navigation unit 1, a monitor 2, a remote controller (abbreviated as a "remote control" from here on) 3, an audio speaker 4, and an external memory 5.

The navigation unit 1 forms the heart of the navigation apparatus, and carries out processes, such as a map display, a route search, a route display, and a route guidance. Especially, a process of switching between a route which uses a car pool lane and a route which does not use the car pool lane, which is a feature of the present invention, is also performed by this navigation unit 1. The details of this navigation unit 1 will be mentioned below.

The monitor 2 corresponds to a display means in accordance with the present invention, a part of an output means in accordance with the present invention, and a part of an input means in accordance with the present invention. The monitor 2 is comprised of, for example, an LCD (Liquid Crystal Display), and displays a map, a vehicle position mark, a recommended route to a destination, and various other messages according to an image signal sent thereto from the navigation unit 1. A remote control light receiving unit 21 is disposed in this monitor 2. The remote control light receiving unit 21 receives a light signal sent thereto from the remote control 3, and sends the light signal, as an input signal, to the navigation unit 1.

The remote control 3 corresponds to another part of the input unit in accordance with the present invention, and is used by a user to scroll a map displayed on the monitor 2, to input a destination, to issue a command for switching between a route using a car pool lane and a route not using the car pool lane, and to answer a message for urging the user to do a certain operation which is outputted from the monitor 2 or the audio speaker 4. Instead of the remote control 3 or together with the remote control 3, a touch panel can be disposed for enabling the user to directly touch a touch sensor mounted on the screen of the monitor 2 to input various pieces of information.

The audio speaker 4 corresponds to another part of the output means, and outputs, by voice, a route guidance message including a guidance about car pool lanes according to an audio signal sent thereto from the navigation unit 1. The external memory 5 is optional, and is comprised of, for example, an HDD (Hard Disk Drive). Map data similar to map data stored in a recording medium 11a inserted into a disk drive unit 11 which will be mentioned below are stored in this external memory 5. Use of this external memory 5 makes it possible to access the map data at a high speed, as well as to store a lot of map data.

Next, the details of the navigation unit 1 will be explained. The navigation unit 1 is comprised of a control unit 10, the disk drive unit 11, a map data storage unit 12, a GPS (Global Positioning System) receiver 13, a speed sensor 14, a gyro sensor 15, a road information receiver 16, an input unit 17, and an output unit 18.

When the recording medium 11a, such as a DVD (Digital Versatile Disc) or a CD (Compact Disc), in which a map database including map data is stored is inserted thereinto, the disk drive unit 11 plays back a content recorded in the recording medium. The map data are defined by nodes, road links, etc., and include link information, such as intersection construction links, destination area data, car pool lane data, and road number data. Whether or not a car pool lane is also provided is specified in a road link.

Car pool lane data include lane information (the position of a car pool lane in all lanes), information about the types of vehicles which can use the car pool lane (e.g., a general vehicle, a bus, a truck, an emergency vehicle, a hybrid vehicle, a motorcycle, and so on), information about the number of passengers which is required of the user to use the car pool lane, information about dates or days of the week on which vehicles can use the car pool lane, and a time zone in which vehicles can use the car pool lane, information about the toll fee of using the car pool lane, etc. The map data played back by this disk drive unit 11 are sent to the map data storage unit 12.

The map data storage unit 12 temporarily stores the map data sent thereto from the disk drive unit 11 or the external memory 5. The map data stored in this map data storage unit 12 are referred to by the control unit 10 and are used for display of information about a car pool lane, a map, roads, various icons, other information, etc., a route search, a route guidance, etc.

The GPS receiver 13 receives GPS signals, via an antenna, from GPS satellites. The GPS signals received by this GPS receiver 13 are sent to the control unit 10. The speed sensor 14 detects the traveling speed of the vehicle on the basis of an external signal sent thereto from the vehicle in which this navigation apparatus is mounted. A speed signal showing the traveling speed of the vehicle detected by this speed sensor 14 is sent to the control unit 10. The gyro sensor 15 detects the traveling direction of the vehicle. A direction signal showing the traveling direction of the vehicle detected by this gyro sensor 15 is sent to the control unit 10.

The road information receiver 16 receives a road information signal transmitted thereto from, for example, an external road traffic data communications system. The road information signal received by this road information receiver 16 is sent to the control unit 10. The control unit 10 generates a message showing congestion information about congestions on roads on the basis of the road information signal received from the road information receiver 16, and notifies the message to the user via the monitor 2 and the audio speaker 4.

The input unit 17 receives and analyzes an input signal sent thereto, via the remote control light receiving unit 21, from the remote control 3, and sends the result of this analysis to the control unit 10 as a command.

The output unit 18 generates an image signal on the basis of drawing data sent thereto from the control unit 10, and also generates an audio signal on the basis of audio data sent thereto from the control unit 10. The image signal generated by this output unit 18 is sent to the monitor 2. As a result, a map, a vehicle position mark, a recommended route to a destination, an intersection guide figure, information about a car pool lane, and so on are displayed on the screen of the monitor 2. Furthermore, the audio signal generated by the output unit 18 is sent to the audio speaker 4. As a result, a guidance voice or the like is outputted from the audio speaker 4.

The control unit 10 is comprised of, for example, a microcomputer, and controls the whole of this navigation unit 1. This control unit 10 is comprised of a vehicle position detecting unit 90, a human-machine interface (abbreviated as "HMI" from here on) unit 100, a map display unit 110, a map matching unit 120, a route searching unit 130, and a route guidance unit 140. Each of these components is comprised of an application program that operates under the control of a microcomputer.

The vehicle position detecting unit 90 detects the current position of the vehicle on the basis of the GPS signals sent thereto from the GPS receiver 13, and also detects the current position of the vehicle with autonomous navigation on the basis of the speed signal sent thereto from the speed sensor 14 and the direction signal sent thereto from the gyro sensor 15. Because the navigation apparatus can detect the current position of the vehicle with autonomous navigation even if the navigation apparatus cannot receive the GPS signals sent thereto from the GPS receiver 13 when, for example, the vehicle is traveling through a tunnel, the navigation apparatus can always detect the current position of the vehicle correctly. Current position data showing the current position of the vehicle detected by this vehicle position detecting unit 90 are sent to the map display unit 110, the map matching unit 120, the route searching unit 130, and the route guidance unit 140.

The HMI unit 100 processes a command sent thereto from a not-shown control panel or the input unit 17 with reference to the map data stored in the map data storage unit 12. This HMI unit 100 carries out communications between the navigation apparatus and the user. The data processed by the HMI unit 100 are sent to the route searching unit 130 and the output unit 18.

The map display unit 110 reads map data about a map of an area surrounding the point shown by the current position data sent thereto from the vehicle position detecting unit 90 from the map data storage unit 12, and generates drawing data for displaying a map, a vehicle position mark, an intersection guide figure, information about a car pool lane, a telop for notifying various pieces of information to the user, etc. on the screen of the monitor 2 on the basis of the map data. The drawing data generated by this map display unit 110 are sent to the output unit 18.

The map matching unit 120 matches the vehicle position shown by the current position data sent thereto from the vehicle position detecting unit 90 to the map shown by the map data read from the map data storage unit 12 so as to form a vehicle position mark on the map. Data showing the vehicle position mark formed by the map matching unit 120 are sent to the map display unit 110 and the route guidance unit 140.

The route searching unit 130 searches for a recommended route from the current position of the vehicle shown by the current position data sent thereto from the vehicle position detecting unit 90 to a destination which is set up by the user by using the remote control 3 (information showing the destination is sent to the route searching unit via the following path: the remote control 3->the remote control light receiving unit 21->the input unit 17->the HMI unit 100) on the basis of the map data read from the map data storage unit 12. The route searching unit also searches for the recommended route according to search conditions and car pool lane use conditions which are set up by the user by using the remote control 3. This route searching unit 130 can perform both a search for a route with car pool lanes being made usable and a search for a route with car pool lanes being made unusable. Route data showing the routes which have been searched for by this route searching unit 130 are sent to the route guidance unit 140.

The route guidance unit 140 generates both drawing data for displaying a route guidance figure on the screen of the monitor 2 and audio data for outputting a voice guidance message by voice on the basis of the current position data sent thereto from the vehicle position detecting unit 90, the data showing the vehicle position mark sent thereto from the map matching unit 120, and the route data about the routes which are searched for by the route searching unit 130, and sends the drawing data and the audio data to the output unit 18.

Figure 2:
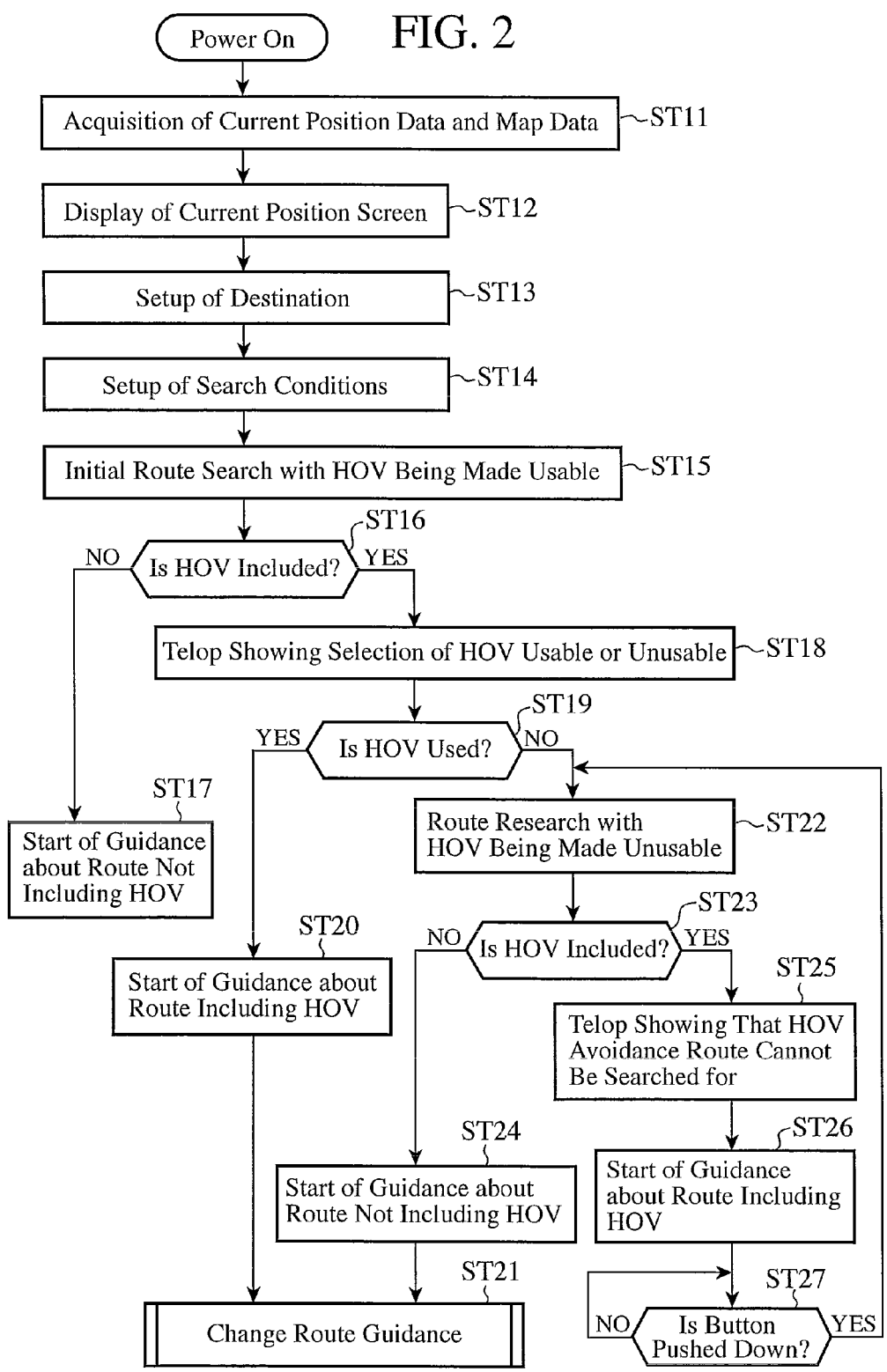
FIG. 2 is a flow chart showing the operation of the navigation apparatus in accordance with Embodiment 1 of the present invention.
Figure 3:
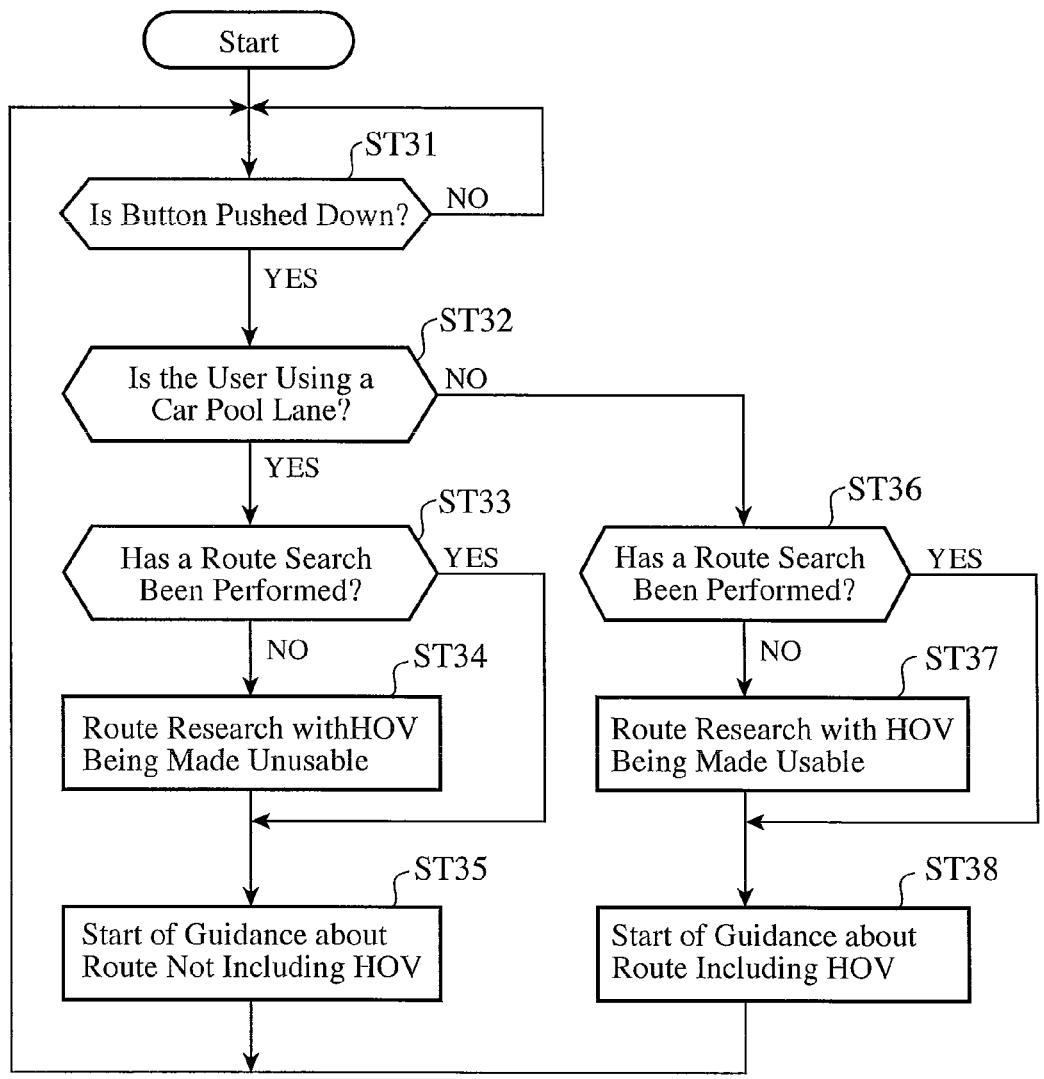
FIG. 3 is a flow chart showing the details of a route guidance changing process performed in step ST21 of the flow chart shown in FIG. 2.

Next, the operation of the navigation apparatus which is constructed as mentioned above will be explained focusing on the process of switching between a route using a car pool lane and a route not using the car pool lane to display either of them on the screen of the monitor 2 with reference to a flow chart shown in FIGS. 2 and 3, and screen display examples shown in FIGS. 4 to 7.

When the power supply of the navigation apparatus is switched on, the navigation apparatus acquires the current position data and map data first (step ST11). More specifically, the vehicle position detecting unit 90 sends either the current position data showing the position of the vehicle which the vehicle position detecting unit detects on the basis of the GPS signals acquired from the GPS receiver 13 or the current position data showing the position of the vehicle which the vehicle position detecting unit detects with autonomous navigation to the map matching unit 120. The disk drive unit 11 reads map data from the recording medium 11a set thereto, and stores the map data in the map data storage unit 12. The map matching unit 120 carries out a matching process of reading the map data from the map data storage unit 12, and superimposing a vehicle position mark on a map at a position corresponding to the current position data received from the vehicle position detecting unit 90. The map data on which this matching process is performed are sent to the map display unit 110 and the route guidance unit 140. The map display unit 110 generates drawing data on the basis of the map data sent thereto from the map matching unit 120, and sends the drawing data to the output unit 18. The output unit 18 generates an image signal on the basis of the drawing data received from the map display unit 110, and sends the image signal to the monitor 2.

A display of a current position screen is then produced (step ST12). More specifically, the monitor 2 draws a map whose center corresponds to the current position of the vehicle on the basis of the image signal received, via the output unit 18, from the map display unit 110. Thereby, the map whose center corresponds to the current position of the vehicle shown by the vehicle position mark is displayed, as the current position screen, on the monitor 2.

Figure 4:
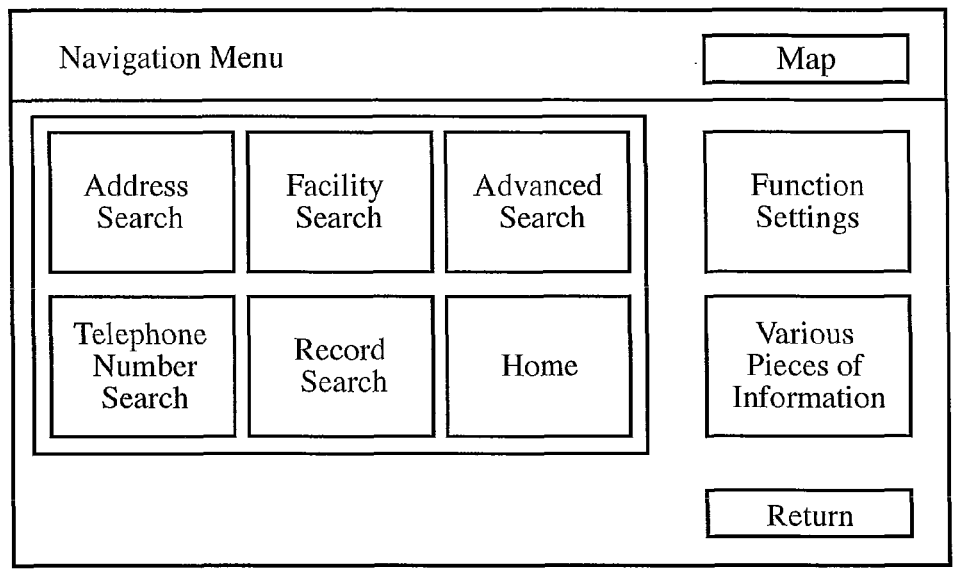
FIG. 4 is a view showing an example of a destination setup screen displayed in the navigation apparatus in accordance with Embodiment 1 of the present invention.

A setup of a destination is then performed (step ST13). More specifically, when the user performs an operation of instructing the navigation apparatus to set up a destination by using the remote control 3, the navigation apparatus displays a destination setup screen as shown in FIG. 4 on the monitor 2. In this destination setup screen, a portion enclosed by a rectangle is a button, and the user is enabled to select a desired button by using the remote control 3 to make the navigation apparatus carry out a function allocated to the desired button. The same goes for each screen which will be explained hereafter. The user selects an address search, a facility name search, a phone number search, or the like by using the remote control 3 to set up a destination (and a via-place as needed) on the map displayed on the monitor 2. Data showing the destination which is set up by the user by using the remote control 3 are sent to the route searching unit 130 via the input unit 17 and the HMI unit 100 of the navigation unit 1.

Figure 5:
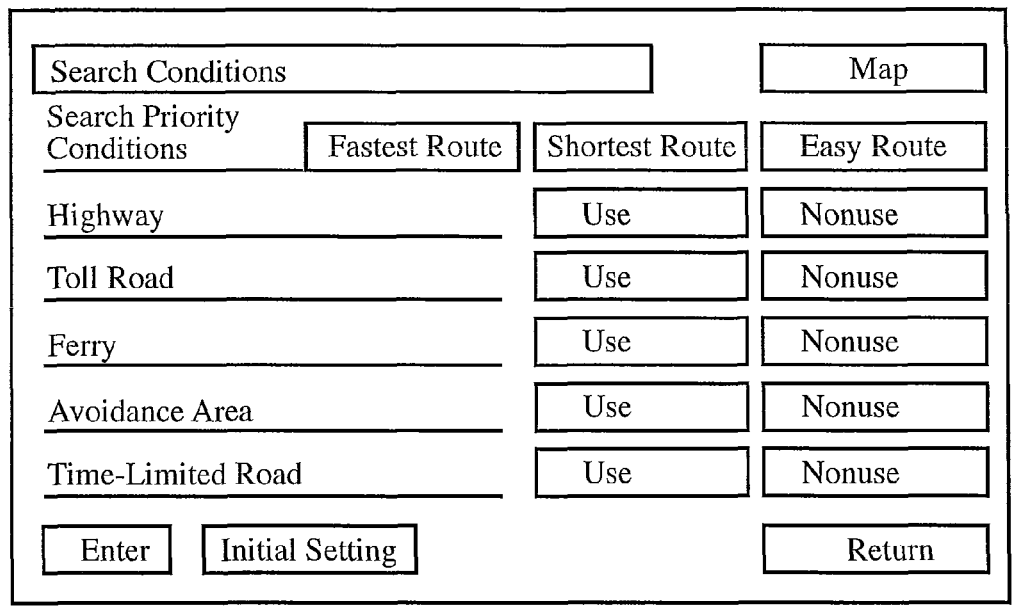
FIG. 5 is a view showing an example of a search condition setup screen displayed in the navigation apparatus in accordance with Embodiment 1 of the present invention.

A setup of search conditions is then performed (step ST14). More specifically, when a setup of a destination in step ST13 is completed, the navigation apparatus displays a search condition setup screen as shown in FIG. 5 on the monitor 2. The user then sets up conditions for the route search which are displayed on the monitor 2 by using the remote control 3. Concretely, the user sets up a higher-priority search condition by pushing one of a button showing "fastest root", a button showing "shortest route", and a button showing "easy root", the buttons showing higher-priority conditions, respectively. The user also sets up whether the navigation apparatus can use each of the following items: a highway, a toll road, a ferry, an avoidance route area, and a time-limited road by pushing down a "use" button or a "nonuse" button.

A "map" button in the search condition setup screen shown in FIG. 5 is used in order to return the screen of the monitor 2 to the current position screen, an "enter" button is used in order to make the settings permanent, an "initial setting" button is used in order to return the search conditions to initial ones, and a "return" button is used in order to return the screen of the monitor to the previous screen. When the "enter" button in this search condition setup screen is pushed down, data showing the set-up search conditions are sent to the route searching unit 130 via the input unit 17 and the HMI unit 100 of the navigation unit 1. After that, the navigation apparatus shifts to a setup of car pool lanes.

For the setup of car pool lanes, a car pool lane (HOV) setup screen as shown in FIG. 6 is displayed. The user sets up car pool lane use conditions by using this car pool lane setup screen. More specifically, the user sets up the following items: restriction enable or disable, a number of passengers, driving lanes, a setting of days of week, a toll fee, and a time zone setting for each of an "entrance" and an "exit" of a car pool plane as needed. When each of the above-mentioned items is not changed, initial settings are adopted as the car pool lane use conditions.

Concretely, when making a setting for the item of "restriction enable or disable", the user pushes down a "Yes" button when imposing restrictions shown in each item displayed below the item, or pushes down a "No" button when not imposing any restrictions shown in each item displayed below the item. When making a setting for the item of "number of passengers", the user inputs the number of passengers who get on the vehicle. The user can change the number of passengers by pushing down either a button disposed on a left side of the display of the number-of-passengers item and having a leftward triangular mark attached thereto, or a button disposed on a right side of the display of the number-of-passengers item and having a rightward triangular mark attached thereto. The same goes for each of the other items.

Furthermore, when making a setting for the item of "driving lanes", the user sets up the number of driving lanes of a highway which the user uses. In addition, when making a setting for the item of "vehicle type", the user sets up a vehicle type which the user uses (a general vehicle, a bus, a truck, an emergency vehicle, a hybrid vehicle, a motorcycle, or the like). Furthermore, when making a setting for the item of "setting of days of the week", the user sets up days of the week on which the user uses the car pool lane. In addition, when making a setting for the item of "toll fee", the user sets up whether or not the car pool lane is a toll one. Furthermore, when making settings for the item of "time zone setting", the user sets up a time zone in which the user uses the car pool lane.

A "map" button in the car pool lane setup screen shown in FIG. 6 is used in order to return the screen of the monitor 2 to the current position screen, an "enter" button is used in order to make the settings permanent, an "initial setting" button is used in order to return the car pool lane use conditions to initial ones, and a "return" button is used in order to return the screen of the monitor to the previous screen. When the "enter button" on this car pool lane setup screen is pushed down, the monitor sends data showing the set-up car pool lane use conditions to the route searching unit 130 via the input unit 17 and the HMI unit 100 of the navigation unit 1. After that, the navigation apparatus advances the sequence to step ST15.

The navigation apparatus, in step ST15, performs an initial route search with car pool lanes (HOV) being made usable. More specifically, the route searching unit 130 searches for a route from the current position determined by the current position data received from the vehicle position detecting unit 90 to the destination set up in step ST13 according to the search conditions and the car pool lane use conditions which are set up in step ST14. The route acquired through the initial route search in this step ST15 is stored in a not-shown memory in order for the navigation apparatus to use the route in a route guidance changing process which the navigation apparatus will perform later.

The navigation apparatus then checks to see whether a car pool lane (HOV) is included in the route acquired through the route search in step ST15 (step ST16). When, in this step ST16, judging that no car pool lane (HOV) is included in the searched-for route, the navigation apparatus starts a guidance about the route which does not include any car pool lane (HOV) (step ST17). More specifically, data indicating the route acquired through the route search in step ST15 are sent to the route guidance unit 140 as data showing the recommended route. As a result, the recommended route which is acquired through the route search is displayed on the monitor 2, and a route guidance is then started. More specifically, the route guidance unit 140 generates drawing data showing a guidance message including the recommended route on the basis of the data showing the recommended route and sends the drawing data to the output unit 18, and also generates audio data showing the guidance message and sends the audio data to the output unit 18. As a result, the guidance message including the recommended route is displayed on the monitor 2 and the voice guidance message is also outputted from the audio speaker 4. After that, guidance messages corresponding to the environments which vary as the vehicle travels are outputted in turn.

When, in above-mentioned step ST16, judging that a car pool lane (HOV) is included in the searched-for route, the navigation apparatus then shows a telop for making the user select whether or not the user can use the car pool lane (HOV) (step ST18). The navigation apparatus then checks to see whether the user has made a selection of using the car pool lane (HOV) (step ST19). When, in this step ST18, judging that the user has made a selection of using the car pool lane (HOV), the navigation apparatus starts a guidance about the route including the car pool lane (HOV) (step ST20). More specifically, data indicating the route acquired through the route search in step ST15 are sent to the route guidance unit 140 as the data showing the recommended route. As a result, the recommended route including the car pool lane 200 as shown in FIG. 7(*a*) is displayed on the screen of the monitor 2, and a route guidance is started. FIG. 7(*a*) shows a display example in a case in which this navigation apparatus is used in the U.S. where car pool lanes exist at this time, and FIG. 7(*b*), which will be mentioned below, also shows a display example in the case in which this navigation apparatus is used in the U.S.

A button 210 for switching between a display of a route which does not use a car pool lane and a display of a route which uses the car pool lane is displayed on the screen on which the recommended route including the car pool lane 200 shown in FIG. 7(*a*) is displayed. While the recommended route including the car pool lane 200 is displayed, a message "HOV unavailable route" showing that there exists a route which does not use the car pool lane is displayed on this button 210. The user can make the monitor switch to a screen, as shown in FIG. 7(*b*), in which a recommended route which does not include the car pool lane 200 is shown by pressing down the button 210 by using the remote control 3.

After starting a guidance about the route including the above-mentioned car pool lane (HOV), the navigation apparatus changes the route guidance (step ST21). As will be mentioned below in detail, when the button 210 is pushed down, the navigation apparatus, in this step ST21, switches to a display of the route not using the car pool lane as shown in FIG. 7(*b*) if the route using a car pool lane as shown in FIG. 7(*a*) is displayed, whereas if the route not using the car pool lane as shown in FIG. 7(*b*) is displayed, the navigation apparatus switches to a display of the route using a car pool lane as shown in FIG. 7(*a*).

When, in above-mentioned step ST19, judging that the user has made a selection of not using the car pool lane (HOV), the navigation apparatus then performs a route search again by making car pool lanes (HOV) unusable (step ST22). The route acquired through the research (rerouting) in this step ST22 is stored in the not-shown memory in order for the navigation apparatus to use the route in the route guidance changing process which the navigation apparatus will perform later. The navigation apparatus then checks to see whether a car pool lane (HOV) is included in the route acquired through the route research in step ST22 (step ST23). The reason why the navigation apparatus checks to see whether a car pool lane (HOV) is included in the route acquired through the route research is that the navigation apparatus has to support a case in which the destination is set up as a point on a car pool lane and a case in which the current position is on a car pool lane.

When, in this step ST23, judging that the car pool lane (HOV) is not included in the route acquired through the route research, the navigation apparatus starts a guidance about the route which does not include the car pool lane (HOV) (step ST24). More specifically, data indicating the route which has been acquired through the route research in step ST22 are sent to the route guidance unit 140 as the data showing the recommended route. As a result, the recommended route which does not include the car pool lane 200 as shown in FIG. 7(*b*) is displayed on the screen of the monitor 2, and a route guidance is started.

A button 210 for switching between a display of a route which does not use the car pool lane and a display of a route which uses a car pool lane is displayed on the screen on which the recommended route not including the car pool lane 200 shown in FIG. 7(*b*) is displayed, like in the case of the screen shown in FIG. 7(*a*). While the recommended route which does not include the car pool lane 200 is displayed, a message "car pool available route" showing that there exists a route using a car pool lane is displayed on this button 210. The user can make the monitor switch to the screen, as shown in FIG. 7(*a*), in which the recommended route including the car pool lane 200 is shown by pressing down the button 210 by using the remote control 3. After this route guidance about the route which does not include the car pool lane (HOV) is started, the navigation apparatus advances the sequence to step ST21 and then performs the above-mentioned route guidance changing process.

In contrast, when, in step ST23, judging that a car pool lane (HOV) is included in the route acquired through the route research, the navigation apparatus then shows a telop for warning the user that any car pool lane (HOV) avoidance route cannot be searched for (step ST25). The navigation apparatus then starts a guidance about the route including the car pool lane (HOV) (step ST26). More specifically, data showing the route acquired through the route research in step ST22 are sent to the route guidance unit 140 as the data showing the recommended route. As a result, the recommended route including the car pool lane 200, as shown in FIG. 7(*a*), which has been researched for is displayed on the screen of the monitor 2, and a route guidance is started.

The navigation apparatus then checks to see whether or not the button 210 on the screen shown in FIG. 7(*a*) is pushed down (step ST27). When, in this step ST27, judging that the button 210 is not pushed down, the navigation apparatus repeatedly carries out this step ST27 and then enters awaiting state, and, in this waiting state, outputs guidance messages corresponding to the environments which vary as the vehicle travels in turn.

In contrast, when, in step ST27, judging that the button 210 is pushed down, the navigation apparatus returns the sequence to step ST22 and then repeats the above-mentioned processing. As a result, when, while driving the vehicle to travel along a route which uses a car pool lane, the user would like to stop the travel along the route which uses the car pool lane according to the current road conditions, and then pushes down the button 210 on the screen as shown in FIG. 7(*a*), the navigation apparatus makes a research for a route with car pool lanes (HOV) being made unusable, and, when judging that a car pool lane is included in the route acquired through this route research again, shows a telop for warning the user that any car pool lane (HOV) avoidance route cannot be searched for, and, after that, starts a guidance about the route including the car pool lane (HOV).

Next, the details of the route guidance changing process performed in above-mentioned step ST21 will be explained with reference to the flow chart shown in FIG. 3.

In this route guidance changing process, the navigation apparatus checks to see whether or not the button 210 on the screen shown in FIG. 7(*a*) or 7(*b*) is pushed down first (step ST31). When, in this step ST31, judging that the button 210 is not pushed down, the navigation apparatus repeatedly carries out this step ST31 and then enters a waiting state, and, in this waiting state, continues the guidance about the route including a car pool lane (HOV) or the guidance about the route not including the car pool lane (HOV) and outputs guidance messages corresponding to the environments which vary as the vehicle travels in turn.

When, in above-mentioned step ST31, judging that the button 210 is not pushed down, the navigation apparatus then checks to see whether or not the route using a car pool lane is being displayed (step ST32). When, in this step ST32, judging that the route using a car pool lane is being displayed, the navigation apparatus checks to see whether or not a route search with car pool lanes being made unusable has been performed (step ST33). When, in this step ST33, judging that a route search with car pool lanes being made unusable has not been performed yet, the navigation apparatus performs a route search with car pool lanes being made unusable (step ST34). In contrast, when, in step ST33, judging that a route search with car pool lanes being made unusable has been performed, the navigation apparatus skips the process of step ST34.

The navigation apparatus then starts a guidance about a route which does not include a car pool lane (HOV) (step ST35). More specifically, either data showing a route acquired through the route research in step ST34 or data showing the route stored in the not-shown memory at the time when the route search has been performed are sent to the route guidance unit 140 as the data showing the recommended route. As a result, the recommended route which does not include the car pool lane 200 as shown in FIG. 7(*b*) is displayed on the screen of the monitor 2, and a route guidance is started. After that, the navigation apparatus returns the sequence to step ST31 and then repeats the above-mentioned processing.

When, in above-mentioned step ST32, judging that the route using a car pool lane is not being displayed, i.e., the route not using the car pool lane is being displayed, the navigation apparatus checks to see whether or not a route search with car pool lanes being made usable has been performed (step ST36). When, in this step ST36, judging that a route search with car pool lanes being made usable has not been performed yet, the navigation apparatus performs a route search with car pool lanes being made usable (step ST37). In contrast, when, in step ST36, judging that a route search with car pool lanes being made usable has been performed, the navigation apparatus skips the process of step ST37.

The navigation apparatus then starts a guidance about a route which includes a car pool lane (HOV) (step ST38). More specifically, either data showing a route acquired through the route research in step ST37 or data showing the route stored in the not-shown memory at the time when the route search has been performed are sent to the route guidance unit 140 as the data showing the recommended route. As a result, the recommended route which does not include the car pool lane 200 as shown in FIG. 7(*b*) is displayed on the screen of the monitor 2, and a route guidance is started. After that, the navigation apparatus returns the sequence to step ST31 and then repeats the above-mentioned processing.

As explained above, when there exists a car pool lane in a route to a destination, the navigation apparatus in accordance with Embodiment 1 of the present invention can make the monitor 2 switch to either a display of the route using the car pool lane or a display of a route not using the car pool lane by receiving a command by using the remote control 3 and the button 21. Therefore, the navigation apparatus can present either the route using the car pool lane or the route not using the car pool lane for the user in response to the user's prompt or easy operation.

Industrial Applicability

As mentioned above, the navigation apparatus in accordance with the present invention can present either a route using a car pool lane or a route not using the car pool lane for a user in response to the user's prompt or easy operation by switching to either a display of the route using the car pool lane or a display of the route not using the car pool lane. Therefore, the navigation apparatus in accordance with the present invention is suitable for use as a vehicle-mounted navigation apparatus or the like that provides a guidance along a route and a route guidance.

The invention claimed is:

1. A navigation apparatus comprising:
   a vehicle position detector configured to detect a current position of a vehicle in which the navigation apparatus is mounted;
   a route searching unit configured to search for a route using a car pool lane or a route not using the car pool lane with respect to a distance between the current position of the vehicle and a destination of the vehicle;
   a memory configured to store the route using the car pool lane or the route not using the car pool lane searched by the route searching unit;
   a display configured to display a route guidance screen, the route guidance screen including the simultaneous display of either the route using the car pool lane or the route not using the car pool lane, and a user interface element recognizing a user operation indicating switching between the display of the route using the car pool lane and the display of the route not using the car pool lane, where the user interface element is continuously displayed on the route guidance screen during route guidance;
   an input unit configured to input a command corresponding to a user operation on the user interface element in the route guidance screen displayed by the display; and
   a controller configured to switch from said route using the car pool lane displayed in the route guidance screen, to the route not using the car pool lane having been stored in the memory or vice versa in accordance with the command inputted by said input unit.

2. The navigation apparatus according to claim 1, further comprising:
   an output unit configured to output while the route not using the car pool lane is displayed, a message indicating that the route using the car pool lane exists, and to output, while the route using the car pool lane is displayed, a message indicating that the route not using the car pool lane exists.

3. The navigation apparatus according to claim 2, wherein the user interface element is also used by the output unit to display a message.

4. The navigation apparatus according to claim 1, wherein the navigation apparatus searches for the route using the car pool lane and the route not using the car pool lane in consideration of conditions including at least one of a car pool lane position, a number of passengers, driving lanes, a vehicle type, days of week, a period of time, and a toll fee.

5. The navigation apparatus according to claim 1, wherein, when the controller implements the switching between the route using the car pool lane and the route not using the car pool lane in accordance with the command inputted by the input unit, the route searching unit searches for the route to be switched to in a case where said route has not been searched.

* * * * *